May 7, 1968 J. L. E. BALDWIN ET AL 3,382,320

TELEVISION FIELD-RECOGNITION APPARATUS

Filed Feb. 1, 1965 3 Sheets-Sheet 1

INVENTORS
JOHN LEWIS EDWIN BALDWIN
JOHN DAVID MILLWARD
BY
Hane and Nydick
ATTORNEYS INVENTORS
JOHN LEWIS EDWIN BALDWIN
JOHN DAVID MILLWARD
BY
Kane and Nydick
ATTORNEYS INVENTORS
JOHN LEWIS EDWIN BALDWIN
JOHN DAVID MILLWARD
BY
Kane and Nydick
ATTORNEYS

United States Patent Office 3,382,320

Patented May 7, 1968

3,382,320

TELEVISION FIELD-RECOGNITION APPARATUS

John Lewis Edwin Baldwin, Croydon, and John David Millward, Orpington, England, assignors to Rank-Bush Murphy Limited Filed Feb. 1, 1965, Ser. No. 429,474
Claims priority, application Great Britain, Jan. 31, 1964, 4,186/64
9 Claims. (Cl. 178—69.5)

This invention relates to improvements in television field-recognition apparatus, that is to say apparatus which will yield an output signal only when the field synchronizing signal corresponding to a particular one of the two kinds of field is present. In all broadcast television systems at present in use interlaced scanning is employed, the odd numbered scanning lines being traversed by the scanning spot during a first field scanning period and the even-numbered lines being scanned during the immediately succeeding field period. When it is required to combine signals from picture signal sources not operating from a common synchronizing signal generator the problem arises of ensuring correct synchronization between the two signals. It is usual to effect such synchronization by providing phase comparator arrangements of which one is fed with the respective line synchronizing signals and yields a control voltage representative of any phase discrepancy between these signals which is applied to control one synchronizing signal generator in such a manner as to bring about the required phase coincidence of the line synchronising signals, while the other is fed with the respective field synchronizing signals and yields a second control voltage which, when line lock has been effected, is applied to control the same synchronizing signal generator by temporarily altering the number of lines per field so as to bring about the required coincidence of field synchronizing signals. Such an arrangement is sometimes disadvantageous as not producing the smooth changes in field synchronization which are necessary if malfunction of the associated equipment is not to be induced.

Accordingly it is an object of the invention to provide apparatus yielding an output signal in response to one only of the two kinds of vertical synchronizing signal.

It is also an object of the invention to provide television field-recognition apparatus making use of transistors as active electronic elements.

It is a further object of the invention to provide field-recognition apparatus yielding at separate output terminals signals corresponding with odd-field and even-field vertical synchronizing impulses.

Broadly speaking, apparatus according to the invention for field recognition in a television system comprises means for developing impulses corresponding with each vertical synchronizing signal in said system, means for developing a signal having a first value during approximately a first half of each scanning line period and a second value at other times, and gate means having a first and a second input and arranged to yield an output signal only when an impulse is implied to said first input and a signal applied to said second input has said first value, together with circuit means for applying said impulses to said first input of said gate means and for applying said signal to said second input of said gate means.

Those features of the invention which are believed to be novel are pointed out with particularity in the appended claims. The invention itself, together with further features and advantages thereof, may best be understood with reference to the accompanying drawings, in the several figures of which like elements are denoted by like reference characters, and in which:

Figure 1:
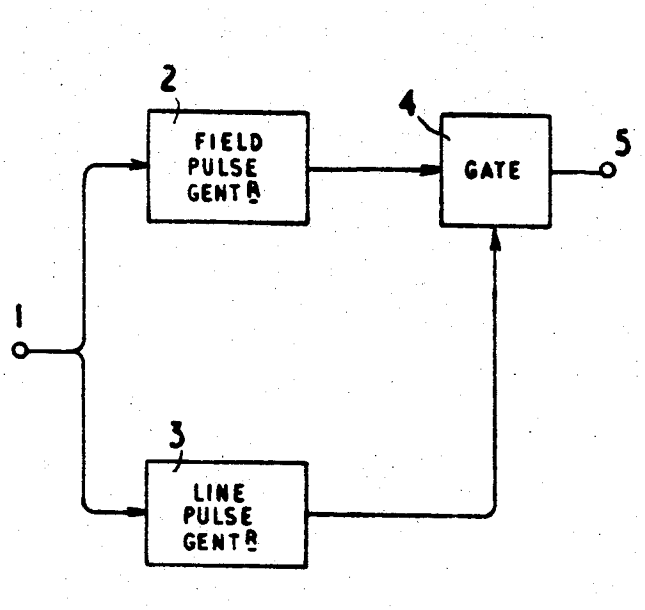
FIGURE 1 is a block schematic diagram of one embodiment of apparatus according to the present invention.
Figure 6:
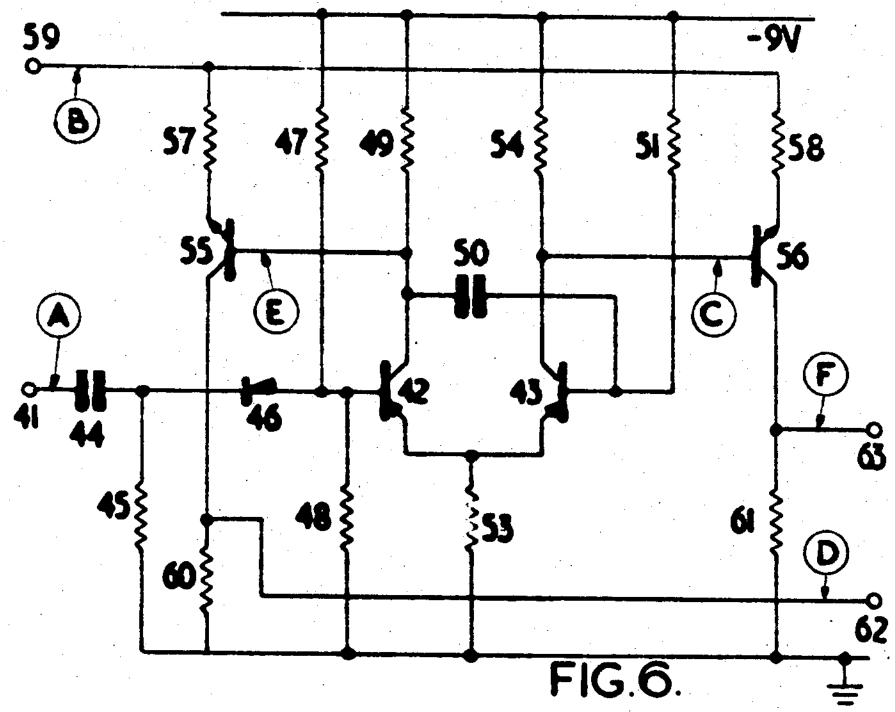
Figure 4:
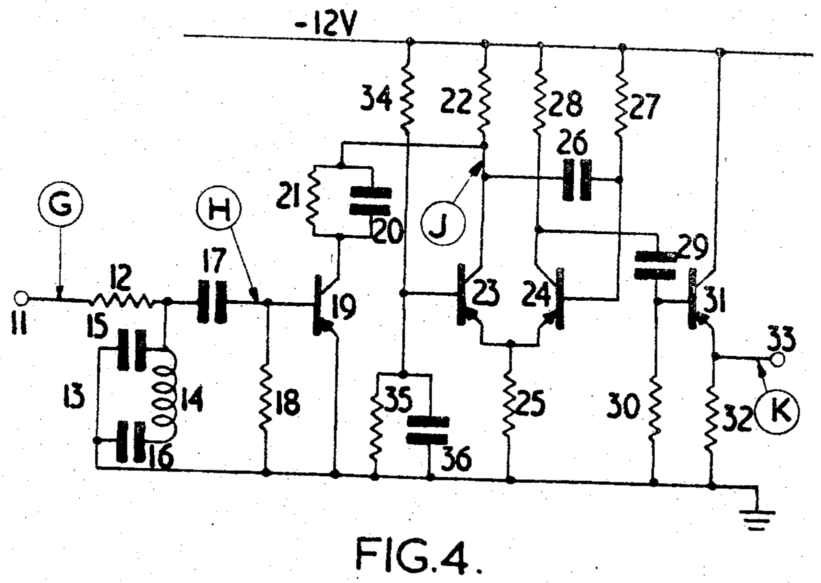
FIGURE 4 is a circuit diagram illustrating a circuit arrangement suitable for carrying out the functions of one of the elements of the apparatus described in relation to FIGURE 1.
Figure 5:
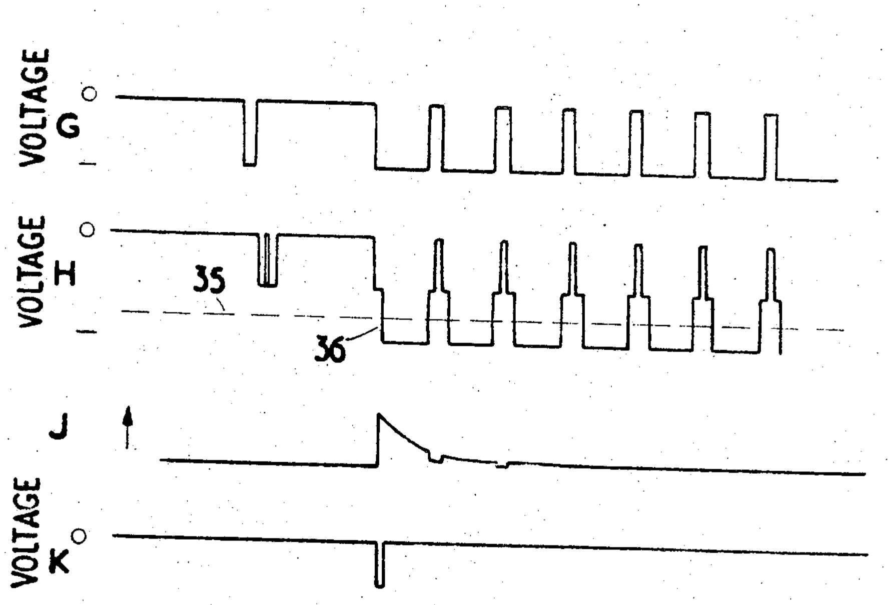

FIGURE 5 comprises a series of waveform diagrams illustrating the operation of the circuit arrangement described in relation to FIGURE 4; and FIGURE 6 is a circuit diagram of apparatus for carrying out the function of another element of the apparatus described in relation to FIGURE 1.

In the arrangement shown in FIGURE 1 television synchronising signals are received at an input terminal 1 whence they are applied firstly to a field pulse generator device 2 where they control the production of brief impulses repetitive each field of the incoming signal and secondly to a line pulse generator 3 in which they control the production of a rectangular signal of line frequency out of approximately 1:1 mark:space ratio. Conveniently the mark:space ratio slightly exceeds 1:1, so that the line pulse generator cannot operate twice during any one line period. The field pulses are then applied to a gate circuit 4 in which they are controlled by the line pulses from generator 3 so that only alternate field pulses pass to an output terminal 5.

Figure 2:
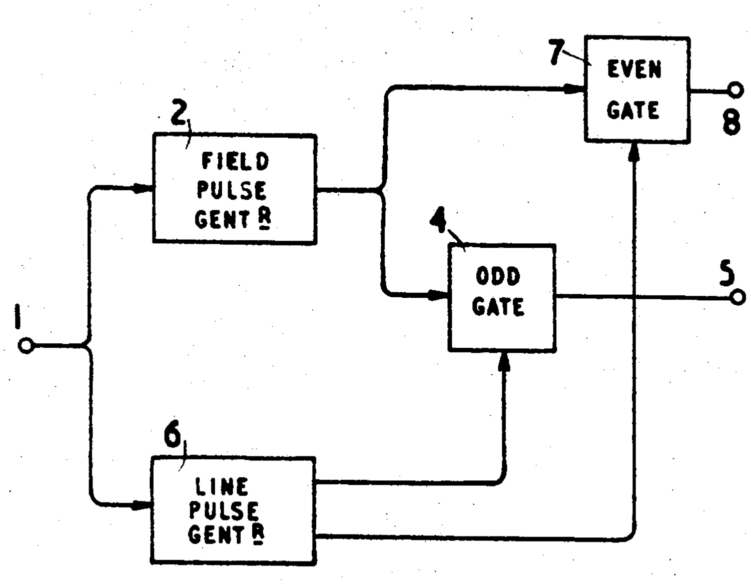
FIGURE 2 is a block schematic diagram of another embodiment of apparatus according to the present invention.

FIGURE 2 shows an extension of the arrangement described in relation to FIGURE 1. Here again incoming synchronising signals received at an input terminal 1 control field pulses developed in a generator 2 and line pulses developed in a generator 6. In this case, however, the line pulses are developed by generator 6 in opposite polarities and are applied separately to control gate circuits 4 and 7 through which field pulses from generator 2 pass to output terminals 5 and 8 respectively. Under these conditions the field pulses related to "odd-line" fields will appear at output terminal 5 and those relating to "even-line" fields at output terminal 8.

The operation of the circuits shown in principle in FIGURES 1 and 2 will be further described with reference to the signal waveform diagrams contained in FIGURE 3. Here waveform A shows the commencement of the field synchronising signals of an ODD and of an EVEN field. Waveform B illustrates the brief pulses, timed from the leading edges of the first broad pulse of each field signal, which are developed by field pulse generator 2. These pulses are necessarily delayed with respect to the controlling edges of the field synchronising signal by rather more than the duration of a line synchronising pulse in order to permit identification of the field pulses as such. Waveform 3C illustrates the pulses of rather more than one half-line duration which are developed by line pulse generator 3 of FIGURE 1, while waveform 3D shows how the operation of gate circuit 4 is to suppress the even-line field pulse while allowing the odd-line field pulse to pass to output terminal 5. The line pulse generator 6 of FIGURE 2 develops a signal of waveform 3C and, as in FIGURE 1, this signal is applied to a gate 4 to extract the odd-line pulses from waveform 3B and allow them to pass to output terminal 5. In addition, generator 6 develops an antiphased line-pulse signal shown in waveform 3E, which is applied to gate circuit 7 which is thus so controlled as to allow only the EVEN field pulses to pass to an output terminal 8, as shown by waveform 3F.

FIGURE 4 shows a circuit arrangement suitable for performing the function of field pulse generator 2 of the apparatus described above in relation to FIGURES 1 and 2, while FIGURE 5 shows the waveforms of signals arising in the apparatus shown in FIGURE 4.

Negative-going synchronising signals received at terminal 11 are applied by way of a resistor 12 to a delay line 13 consisting of a series inductor 14 and shunt capacitors 15 and 16, which is unterminated at its far end. The applied signal is therefore reflected to the input of the line in the same polarity as that in which it is applied, after a time equal to twice the signal delay of the line. This time is chosen to be somewhat greater than the duration of a line synchronising signal and may conveniently be 12 μs. The signals thus arising at the input of the line 13, which are illustrated by waveform H in FIGURE 5, are applied by way of a capacitor 17 and across a resistor 18 to the base of a p-n-p transistor 19 having its emitter earthed. Transistor 19 will therefore conduct only by negative-going signals applied to its base. The time-constant of capacitor 17 and resistor 18 is made sufficiently large, conveniently some 250 ms., that the base potential of transistor 19 stabilises itself at such a value that only the peaks of the combined overlapping initial and reflected signal of waveform 5H occurring during the field synchronising pulses cause transistor 19 to conduct.

The collector of transistor 19 is returned to the negative line by way of the parallel combination of a capacitor 20 and a resistor 21, and by way of a resistor 22 which also forms the collector load of a transistor 23.

The time-constant provided by the parallel combination of capacitor 20 and resistor 21 in the collector lead of transistor 19 is chosen such that an appreciable change in the current passed by this transistor occurs only on the leading edge of the first broad pulse of the series of such pulses comprising a field synchronising signal. A convenient value for this time-constant is 1 millisecond. Transistor 23, together with a further transistor 24, forms a monostable multivibrator, for the emitters of the two transistors are returned to the earthed positive supply line by way of a common resistor 25 and the collector of transistor 23 is coupled to the base of transistor 24 by way of a coupling capacitor 26. The base of transistor 24 is returned to the negative supply line by way of a resistor 27, while its collector is also returned to the negative line by way of a load resistor 28, signals appearing across which are fed by way of a capacitor 29 across a resistor 30 to the base of a transistor 31 which has its collector taken directly to the negative line and its emitter returned to the positive line by way of a load resistor 32. Signals arising across emitter load resistor 32 of transistor 31 are fed out by way of an output terminal 33. The base of transistor 23 is held at an appropriate direct potential by means of resistors 34, 35 which are connected from the base to the negative and positive lines respectively. A capacitor 45 bypasses the base of transistor 24 to earth at signal frequencies.

When transistor 19 passes current for the first time in response to the leading edge of the first broad pulse of a field synchronising signal the resultant positive-going change in potential appearing at the collector of transistor 23 is applied by way of coupling capacitor 26 to the base of transistor 24. This transistor is normally conductive, for its base is returned to the negative line, while that of transistor 23 is held at a more positive potential. The positive-going signal now applied to the base of transistor 24 causes the transistor to be cut off so that the monostable trigger formed by transistor 23, 24 passes into its quasi-stable condition, with transistor 23 conducting and transistor 24 cut off. The time constant, determined by the values of capacitor 26 and resistor 27, which controls the duration of this condition is chosen to yield a negative-going pulse of 8 μs. duration at the collector of transistor 24 and hence at output terminal 31.

In a practical embodiment of the circuit arrangement described above with reference to FIGURE 4 the following component values were employed:

| Resistors: | Ohms |
|---|---|
| 12 | 2.7K |
| 18 | 560K |
| 21 | 100K |
| 22 | 1K |
| 25 | 330 |
| 27 | 10K |
| 28 | 470 |
| 30 | 10K |
| 32 | 4.7K |
| 34 | 680 |
| 35 | 220 |

| Capacitors: | | |
|---|---|---|
| 15 | pf | 1500 |
| 16 | pf | 2200 |
| 17 | μf | 0.47 |
| 20 | pf | 1500 |
| 26 | pf | 1500 |
| 29 | μf | 0.1 |
| 36 | μf | 8 |

| Transistors: | Mullard |
|---|---|
| 19 | OC 202 |
| 23 | GET 882 |
| 24 | GET 882 |
| 31 | GET 882 |

Inductor 14 ---- mh -- 4

The action of this circuit arrangement is further illustrated by the waveform diagrams shown to a common time scale in FIGURE 5. Here waveform G illustrates the negative-going mixed synchronizing signals received at terminal 11, while waveform H shows the voltage arising at the base of transistor 19, where the initial signal is mixed with the signal reflected from the far end of delay line 13. Broken line 35 indicates the potential which negative-going pulses applied to the base of transistor 19 must exceed if the transistor is to pass current. Such an event is indicated at 36. As has already been explained, the time constant circuit 20, 21 prevents the current through transistor 19 varying substantially in response to edges in the field synchronizing signal after the leading edge. This action is illustrated by waveform J which represents the current through transistor 19. Waveform K of FIGURE 5 shows the voltage pulse developed by monostable multivibrator 23, 24 when triggered by the leading edge response of transistor 19 and fed out by way of output terminal 31.

FIGURE 6 shows one embodiment of apparatus suitable for carrying out the functions of devices 4, 6, and 7 of FIGURE 2. Negative-going mixed synchronising signals, illustrated by waveform A of FIGURE 3 are received at an input terminal 41 whence they are applied to control the action of a monostable multivibrator formed by transistors 42, 43. The received signal is differentiated by a series capacitor 44 and a shunt resistor 45 and applied by way of a diode 46, which suppresses the positive-going spikes of the resultant signal, to the base of transistor 42. The mean direct potential of this base is held at a suitable value by means of resistors 47, 48 by which it is returned to the negative and positive lines respectively. The collector of transistor 42 is returned to the negative line by way of a load resistor 49, signals arising across which are applied through a coupling capacitor 50 to the base of transistor 43. The base of transistor 43 is returned to the negative line by way of a resistor 51. The emitters of transistors 42 and 43 are returned to the positive line by way of a common resistor 53, thus forming a monostable multivibrator for which the duration of the quasi-stable condition, in which transistor 42 is conductive and transistor 43 is cut off, is determined by values of capacitor 50 and resistors 51, 52. This time-constant is so chosen that the quasi-stable condition persists for a period slightly longer than one-half the duration of a single scanning line. The collector of transistor 43 is returned to the negative line by way of a load resistor 54.

Figure 3:
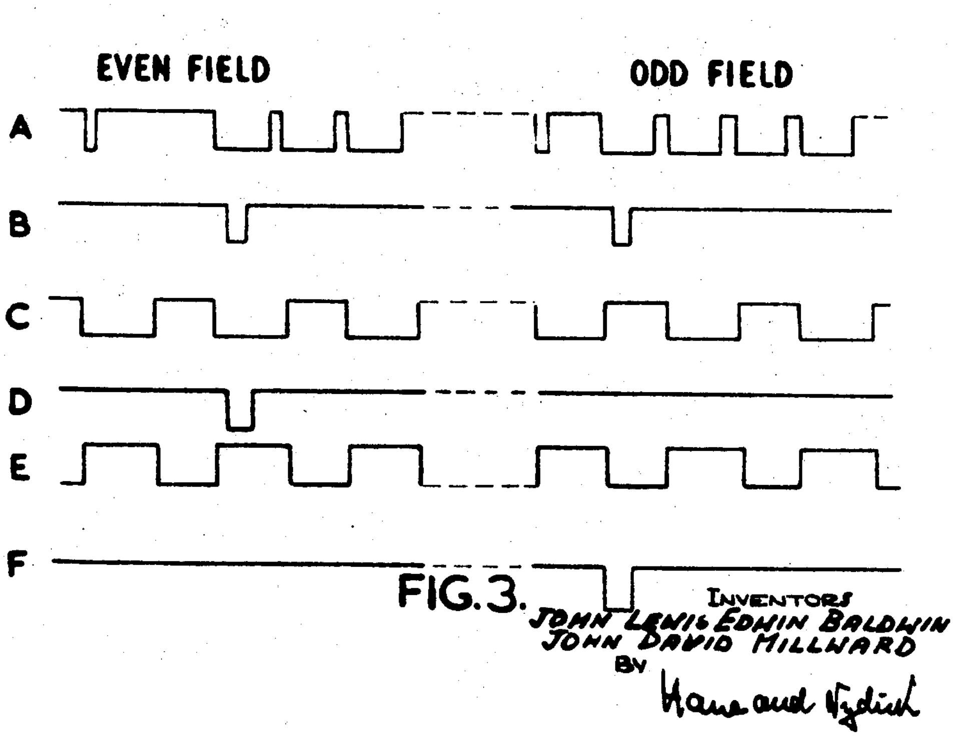
FIGURE 3 is a series of waveform diagrams illustrating the operation of the apparatus described in relation to FIGURE 1.

As shown by waveforms C and E of FIGURE 3, the signals appearing at the collectors of transistors 42, 43 are like square-wave signals in which the mark:space ratio differs slightly from 1:1, in order to prevent a coincidence of transient states giving rise to spurious operation. These signals are applied respectively the bases of further, n-p-n transistors 55 and 56, the emitters of which are fed, by way of respective limiting resistors 57, 58, with the negative-going 8 $\mu$s. pulses shown by waveform 3B which are applied to input terminal 59 from terminal 31 of FIGURE 4. Transistors 55, 56 can thus pass current only when a negative-going pulse applied to its emitters coincides with a positive-going signal fed to its base. Consideration of waveforms B, C and E of FIGURE 3 will show that this condition arises for transistor 55 only during odd field synchronizing signals and for transistor 56 during even field synchronising signals. The outputs appearing across collector load resistors 60, 61 of transistors 55, 56 respectively and applied thence to output terminals 62, 63 respectively are thus, as illustrated by waveforms 3D, 3F, narrow pulses occurring during the respective field synchronising signals.

In a practical embodiment of the circuit arrangement described above with reference to FIGURE 6, the following component values were employed:

| Resistors: | Ohms |
|---|---|
| 45 | 1K |
| 47 | 680 |
| 48 | 220 |
| 49 | 1K |
| 51 | 15K |
| 52 | 68K |
| 53 | 330 |
| 54 | 470 |
| 57 | 470 |
| 58 | 470 |
| 60 | 3.3K |
| 61 | 3.3K |
| **Capacitors:** | |
| 44 | pf__ 220 |
| 50 | $\mu$f__ 0.0047 |
| **Transistors:** | Mullard |
| 42 | GET 882 |
| 43 | GET 882 |
| 55 | OC 140 |
| 56 | OC 140 |

It will be appreciated that while transistor circuits are particularly described above the use of thermionic valves as the active electronic devices in equivalent circuits is not excluded from the scope of the invention.

We claim:

1. Television field-recognition apparatus comprising, in combination: a source of mixed television synchronizing signals including horizontal synchronizing signals and vertical synchronizing signals each comprising a train of broad pulses, said vertical synchronizing signals being differently timed with respect to said horizontal synchronizing signals in odd and in even fields; circuit means operating when fed with a signal including vertical synchronizing signals to yield output impulses corresponding to the leading edge of the first broad pulse of a vertical synchronizing signal; means for applying said television synchronizing signal to said circuit means; further circuit means operating when fed with a signal including horizontal synchronizing signals to develop a two-valued signal having a first value during a period approximating the first half of each horizontal period and having a second value at other times; means for applying said mixed synchronizing signals to said further circuit means; gate means having first and second inputs and an output and operating to yield a signal at said output when an impulse is applied to said first input only when a signal applied to said second input has a predetermined one of said values; means for applying said output impulses to said first input; and means for applying said two-valued signal to said second input, whereby said gate means yields signals corresponding with a predetermined set of said odd or even fields.

2. Apparatus in accordance with claim 1 in which said further circuit means comprises a monostable multivibrator actuable in response to an applied impulse from a stable condition yielding an output signal having said first value to a quasi-stable condition yielding an output signal having said second value, from which said multivibrator returns to said stable condition after a predetermined dwell period.

3. Apparatus in accordance with claim 1 in which said further circuit means comprises a monostable multivibrator actuable in response to an applied impulse from a stable condition yielding an output signal having said first value to a quasi-stable condition yielding an output signal having said second value, from which said multivibrator returns to said stable condition after a predetermined dwell period exceeding one half a horizontal scanning period.

4. Apparatus in accordance with claim 1 in which said gate means comprises an active electronic device having common, control and output electrodes; a common input terminal, a first input terminal; a resistor connecting said common electrode to said first input terminal; a second input terminal; a connection between said second input terminal and said control electrode; means for applying said two-valued signal between said common input terminal and one of said first and second input terminals; means for applying said impulse signal between said common input terminal and the other of said first and second input terminals; a resistor connecting said output electrode to said common input terminal; said signals being applied to said input terminals with a polarity and an amplitude making said active device conductive; an output terminal; and a signal connection between said output electrode and said output terminal.

5. Apparatus in accordance with claim 1 in which said pulse signal generator means and said gate means together comprise the combination of: first and second active electronic devices, each having common, input and output electrodes; passive circuit means coupling said output electrode of one said device with said input electrode of the other said device for stable operation; passive circuit means coupling said output electrode of said other device with said input electrode of said one device for quasi-stable operation; means for applying said impulse signals to a said active device to induce said quasi-stable condition of operation; a third active electronic device having common, input and output electrodes; first and second supply terminals; individual resistors respectively connecting said common and output electrodes of said third active device to respective ones of said supply terminals; a connection from an electrode of said first or second device to said control electrode of said third active device; an output terminal; a connection from said output electrode of said third active device to said output terminal; and circuit means for applying said impulse signals between said supply terminals with a polarity and amplitude making said third active device operable.

6. Television field-recognition apparatus comprising, in combination: a source of mixed television synchronizing signals including horizontal synchronizing pulses and vertical synchronizing signals comprising trains of broad pulses in which the leading edges of said pulses have predetermined timings, vertical pulse generator means operating when fed with mixed television synchronizing signals to yield pulse signals fixedly related in time to the leading edge of the first said broad pulse of each said train; pulse signal generator means operable by applied television synchronizing signals to yield rectangular pulse signals of approximately 1:1 mark/space ratio repetitive at horizontal frequency; means for applying said mixed synchronizing signals to said vertical pulse generator means and to said pulse signal generator means; gate means having first and second inputs and an output, said gate means yielding a signal at said output only in the presence of an input signal of predetermined kind at said first input and in the absence of an input signal from said second input; means for applying said pulse signals to said first input of said gate means and means for applying said rectangular pulse signals to said second input of said gate means, whereby said gate means yields a signal at said output once only during each complete picture period of said television synchronizing signal.

7. Apparatus in accordance with claim 5 in which said vertical pulse generator means comprises the combination of: a source of stabilized mixed synchronising signals including horizontal synchronizing pulses and vertical synchronizing signals at a predetermined amplitude; a delay line having a delay time exceeding one half the duration of said horizontal synchronizing pulses; a terminating resistance connected to the input of said delay line; means for applying said stabilized synchronizing signals to said input of said delay line; trigger means responsive to applied signals having an amplitude exceeding a predetermined trigger level to yield an impulse signal, said trigger level being greater than said predetermined amplitude but less than twice said amplitude, and means for applying signals arising at said input of said delay line to said trigger means, whereby said trigger means yields said impulse signal only in response to said vertical synchronizing signals.

8. Television field-recognition apparatus comprising, in combination: a source of mixed television synchronizing signals including horizontal synchronizing signals and vertical synchronizing signals each comprising a train of broad pulses, said vertical synchronizing signals being differently timed with respect to said horizontal synchronizing signals in odd and in even fields; circuit means operating when fed with a signal including vertical synchronizing signals to yield output impulses corresponding to the leading edge of the first broad pulse of a vertical synchronizing signal; means for applying said television synchronizing signal to said circuit means; further circuit means operating when fed with a signal including horizontal synchronizing signals to develop a two-valued signal having a first value during the period approximating the first half of each horizontal period and having a second value at other times; means for applying said mixed synchronizing signals to said further circuit means; first and second gate means each having a first and a second input and an output and each operating to yield a signal at said output when an impulse is applied to said first input only when a signal applied to said second input has a predetermined one of said values; means for applying said output impulses alike to said first input of each said gate means and means for applying said two-valued signal in one phase to said second input of one said gate means and for applying said two-valued signal in the phase opposite to said one phase to said second input of the other of said gate means; whereby said gate means respectively yield output signals representing series of alternate vertical synchronizing signals in said synchronizing signal.

9. Apparatus in accordance with claim 8 in which said further circuit means together with said first and second gate means comprises the combination of: first and second active devices coupled in one direction for stable operation and in the other direction for quasi-stable operation; means for applying said synchronizing signals including horizontal synchronizing pulses to a said active device to induce said quasi-stable condition in response to said horizontal synchronizing pulses, a third and a fourth active device each having common, control and output electrodes; first and second common supply terminals; individual resistors connecting each said common electrode to one supply terminal; individual resistors connecting each said output electrode to the other supply terminal; individual connections from like electrodes of said first and second active devices to the control electrodes of said third and fourth active devices respectively; first and second output terminals; connections from the output electrodes of said third and fourth active devices to individual ones of said output terminals; and circuit means for applying said impulse signals between said supply terminals with a polarity and amplitude making said third and fourth active devices operable.

References Cited

UNITED STATES PATENTS 2,742,523 4/1956 Preisig et al. -------- 178—5.4

ROBERT L. GRIFFIN, *Primary Examiner.*

R. L. RICHARDSON, *Assistant Examiner.*